April 18, 1961 J. E. CLEMENS ET AL 2,980,319

PORTABLE RECORD SENSING AND RECORDING APPARATUS

Filed Dec. 30, 1957 9 Sheets-Sheet 1

Inventors
John E. Clemens
Hubert W. Dean
Edward R. Thomas
William S. Touchman
By their Attorney April 18, 1961 J. E. CLEMENS ET AL 2,980,319

PORTABLE RECORD SENSING AND RECORDING APPARATUS

Filed Dec. 30, 1957 9 Sheets-Sheet 2

April 18, 1961 J. E. CLEMENS ET AL 2,980,319

PORTABLE RECORD SENSING AND RECORDING APPARATUS

Filed Dec. 30, 1957 9 Sheets-Sheet 3

April 18, 1961 J. E. CLEMENS ET AL 2,980,319

PORTABLE RECORD SENSING AND RECORDING APPARATUS

Filed Dec. 30, 1957 9 Sheets-Sheet 5

PORTABLE RECORD SENSING AND RECORDING APPARATUS

April 18, 1961 J. E. CLEMENS ET AL 2,980,319

PORTABLE RECORD SENSING AND RECORDING APPARATUS

Filed Dec. 30, 1957 9 Sheets-Sheet 8

PORTABLE RECORD SENSING AND RECORDING APPARATUS

United States Patent Office 2,980,319

Patented Apr. 18, 1961

2,980,319

PORTABLE RECORD SENSING AND RECORDING APPARATUS

John E. Clemens, Xenia, Ohio, Hubert W. Dean, Cambridge, Mass., and Edward R. Thomas, Dayton, and William S. Touchman, Cedarville, Ohio, assignors to A. Kimball Company, New York, N.Y., a corporation of New York Filed Dec. 30, 1957, Ser. No. 706,044

12 Claims. (Cl. 234—30)

This invention relates to record controlled, record reproducing apparatus, and more particularly to portable apparatus for sensing individual data bearing control records, and for reproducing the sensed data in another record.

The preferred embodiment of the invention is directed to the sensing of records of the type disclosed in United States Patent No. 2,692,083, granted October 19, 1954 to A. K. Marsh. This type of record in the form of a perforated tag is ideally suited for attachment to merchandise or like articles, the record tag being provided with data indications which may be visually read as well as automatically read by special data processing equipment. In the ordinary use of such tags, upon sale or other disposal of the article, the tag or a duplicate section thereof is removed from the article and sent to a central data processing area having special high speed equipment designed to read the data from the tag and reproduce such data into another record form. Such special equipment is relatively immobile, and, therefore, the tags are usually processed in large numbers at a central location.

At times, however, it is highly desirable to process the data on individual tags in areas remote from such special equipment without first removing the tags from the articles to which they relate. For one example, when taking inventory of articles on hand, it is impractical to remove the tags for processing in a central area since the tags would later need to be reattached to the related articles, generally resulting in great confusion. Such an operation would be highly inefficient and costly. Accordingly, inventory is usually taken manually with a great deal of handwritten reports. Such an operation also is expensive, since it requires a great deal of time and care to avoid errors.

Accordingly, it is the principal object of the invention to provide portable data recording equipment suitable for use in areas remote from usual data processing equipment. Such portable equipment may be utilized for recording data obtained from records, such as tags, while attached to the articles to which they relate. Thus, the data relating to each article may be recorded at its storage site with a minimum of operator skill. To this end a hand-held sensing device is provided to read the data recorded on individual record cards or tags while still attached to their related articles. The data thus read is then recorded on another record, which in the illustrated embodiment is in the form of a perforated tape. Thus, the broad object of the invention is directed to the combination of a hand-held sensing device with portable recording apparatus for reproducing data on another record.

A further principal object of the invention is directed to the provision of a hand-held sensing device. This sensing device is provided with sensing means adapted to sense all recorded data on a record with a single operation of the device. For accurately positioning the record relative to the sensing means, a thin tray initially projects from the unit in an exposed position suitable for placement of the tag on the tray regardless of the means by which the tag is attached to its related article. After placement of a tag, the tray is moved into a sensing position adjacent the sensing means. So that the data on the record may be sensed, manually operated means are provided to effect relative movement between the sensing means and the tray.

Another object of the invention is the provision of simple and inexpensive means for sensing data indications on a statistical record and for storing the data represented by such indications for further processing.

Another object of the invention is the provision of simple and economical apparatus adapted for the sequential presentation of data represented by groups of data indications on a statistical record in which apparatus record transportation is facilitated by minimizing the time during which the record sensing unit must co-operate with a record.

To these ends and in accordance with a feature of the invention, apparatus is provided having a record sensing unit operative simultaneously to sense all data indicative positions on a record, data storage means comprising a plurality of variably conditionable elements each corresponding to a predetermined data indicative position on a record, means controlled by said sensing unit to condition said storage units in accordance with the data indications on a statistical record being sensed, and data access means operative sequentially to derive the data stored in predetermined groups of the storage units. In the illustrative apparatus the storage means comprises a group of capacitors and connecting means are provided under control of switches in the sensing unit for charging the capacitors of the bank selectively in accordance with the data indications on a record card. For providing access to the information thus stored, sequentially to present data represented by predetermined groups of data indications on the record, a plurality of stepping switches are connected to be operative for connecting output terminals of the switches with successive groups of capacitors whereby utilizing devices such as voltage-sensitive relay decoding and printing or punching apparatus may be controlled by the storage bank.

Accordingly to another object of the invention provision is made in the sensing unit by perforating the record simultaneously with the sensing operation to indicate that the tag has been read. To this end a plurality of punches are mounted adjacent the sensing means. A single interposer is adjusted over the punches so that only one or none of a number of punches are actuated simultaneously with the manually actuated sensing operation. The perforation produced in the tag serves as a visual reminder to the operator that the tag has been read and also may serve as a control perforation when the tag is later processed on central data processing equipment.

The above and other features of the invention together with novel details of construction and combinations of parts will now be described with reference to the drawings and thereafter pointed out in the claims.

Figure 9:
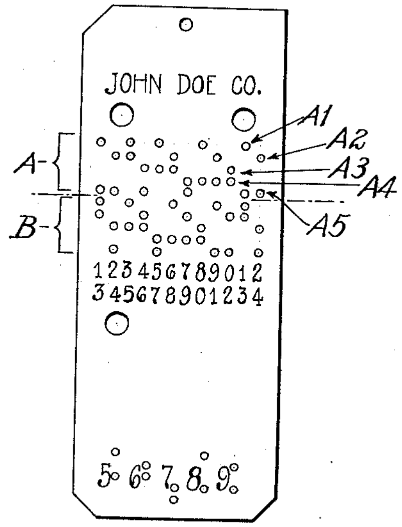
Fig. 9 is an illustration of a typical perforated record tag.
Figure 10:
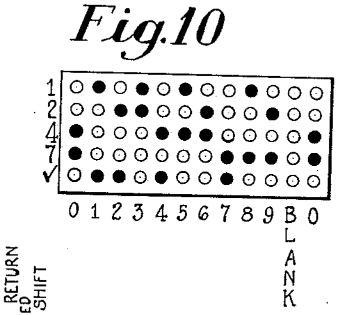
Figure 11:
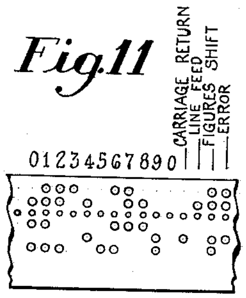
Figure 12:
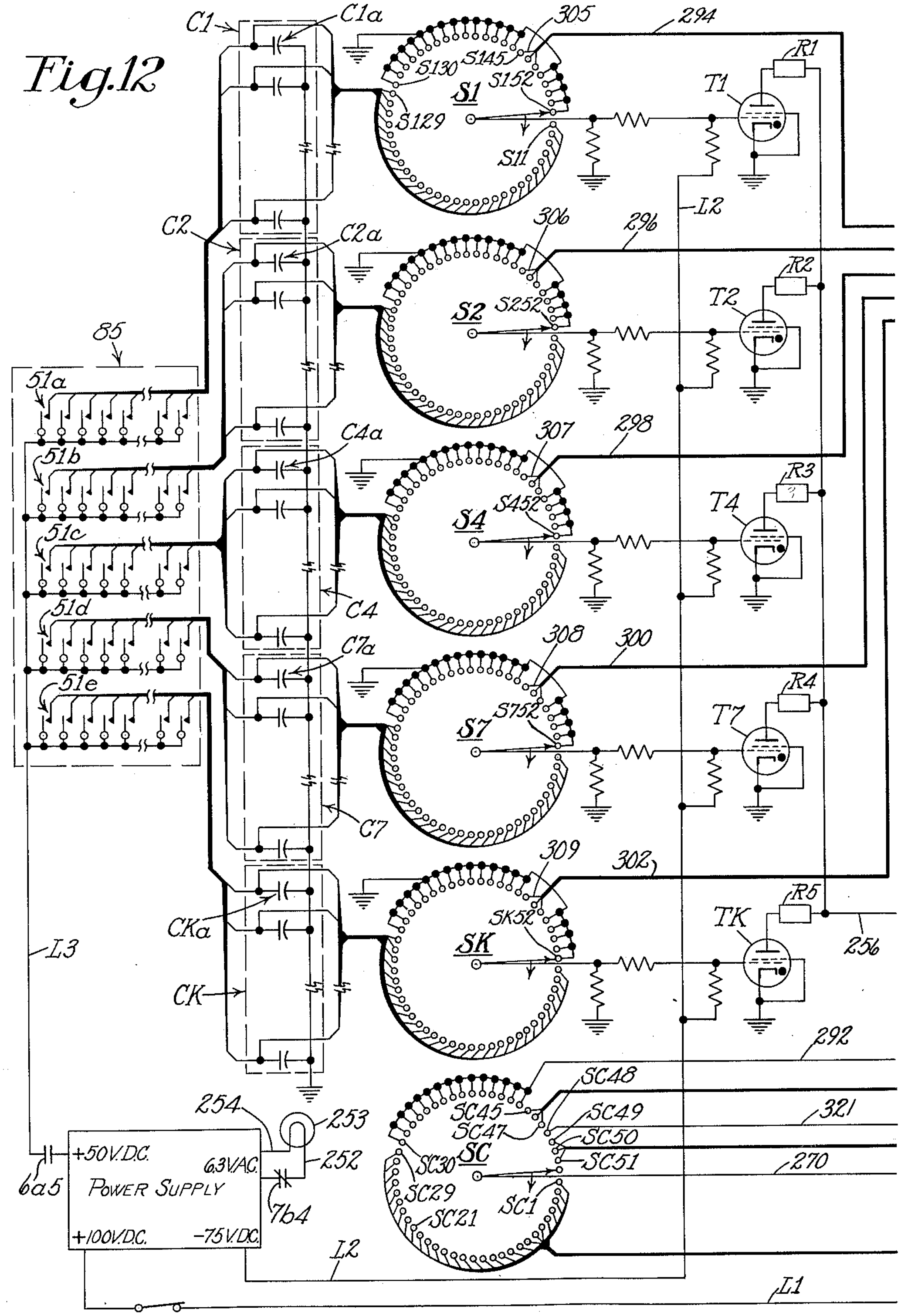
Figure 13:
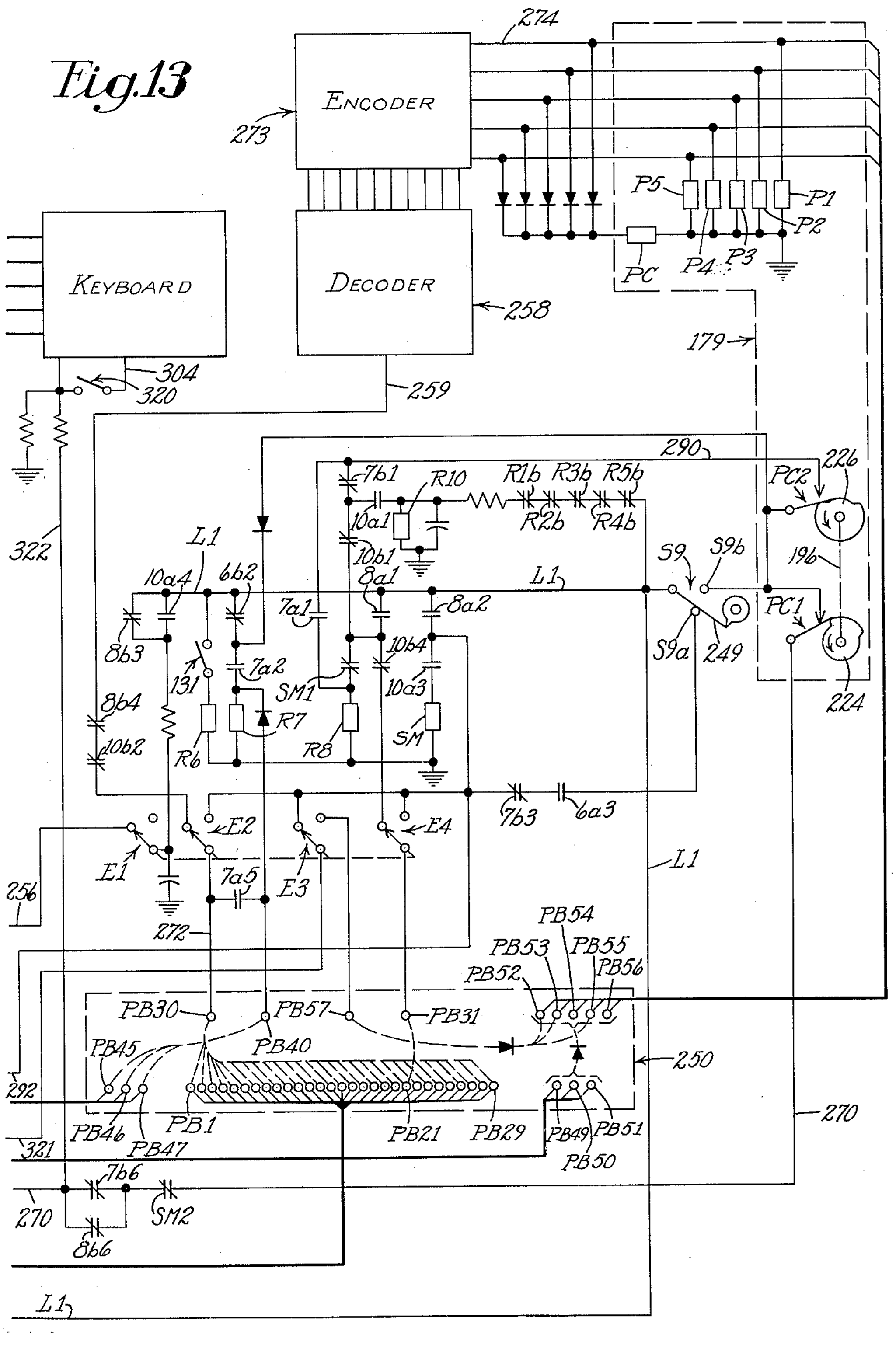
Figure 14:
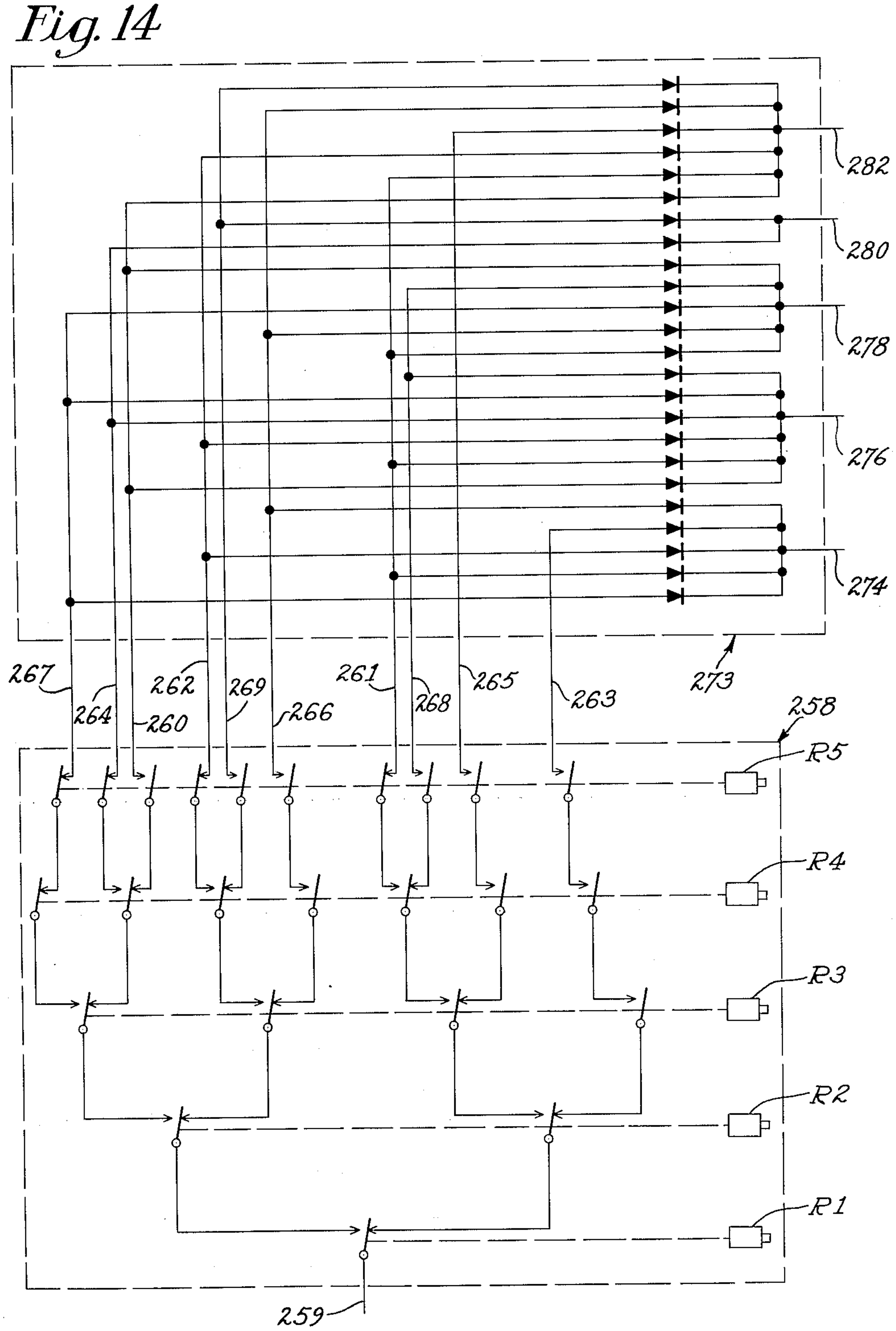
Figure 15:
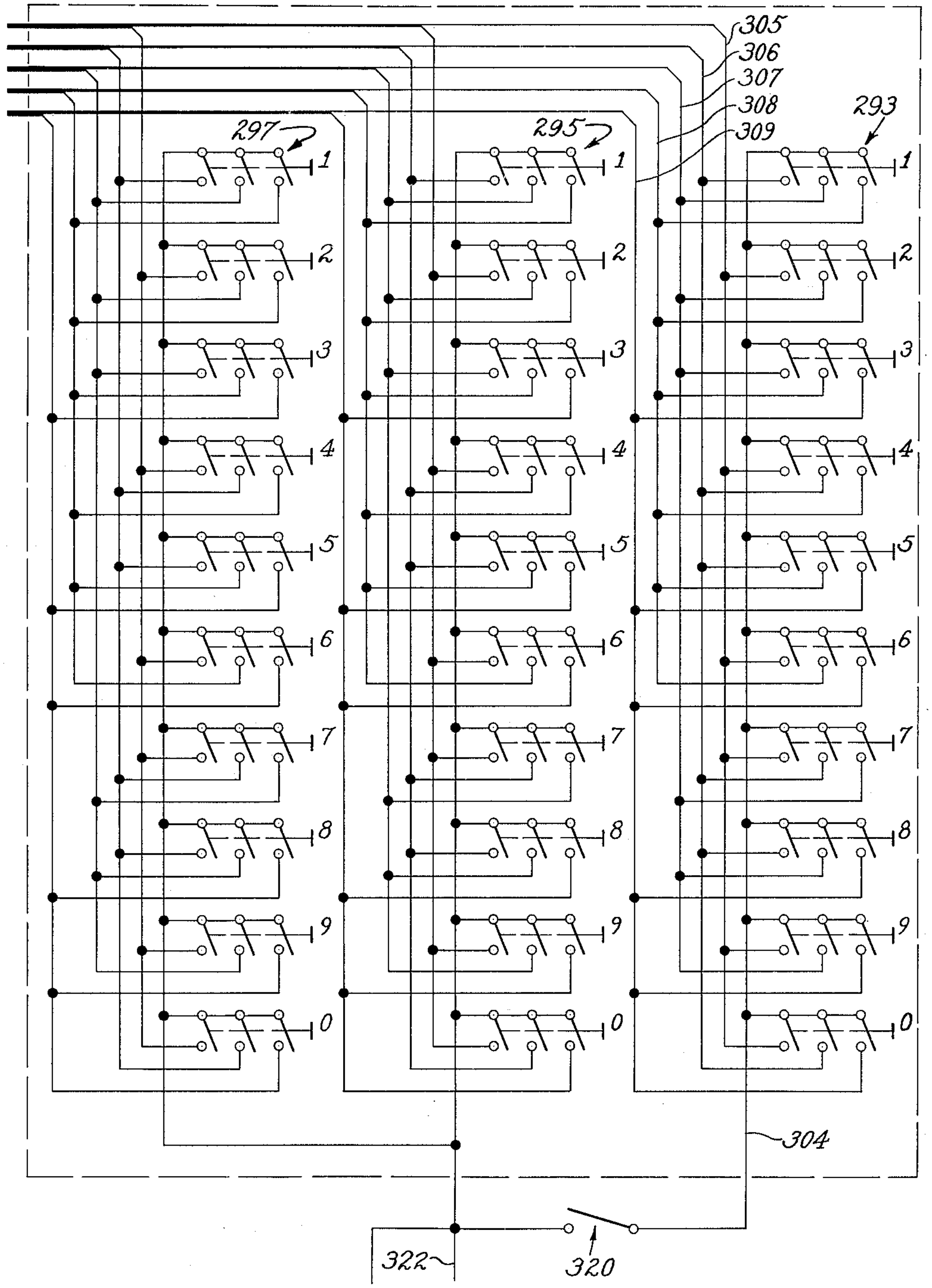

Fig. 10 indicates the code utilized in the tag of Fig. 9;

Fig. 11 is a portion of a perforated record tape with the code values indicated thereon;

Figs. 12 and 13 taken together illustrate the wiring diagram of the control circuits of the recording system;

Fig. 14 illustrates the wiring diagram of the decoder and encoder circuits;

Fig. 15 is a wiring diagram of the keyboard circuits; and

Figure 16:
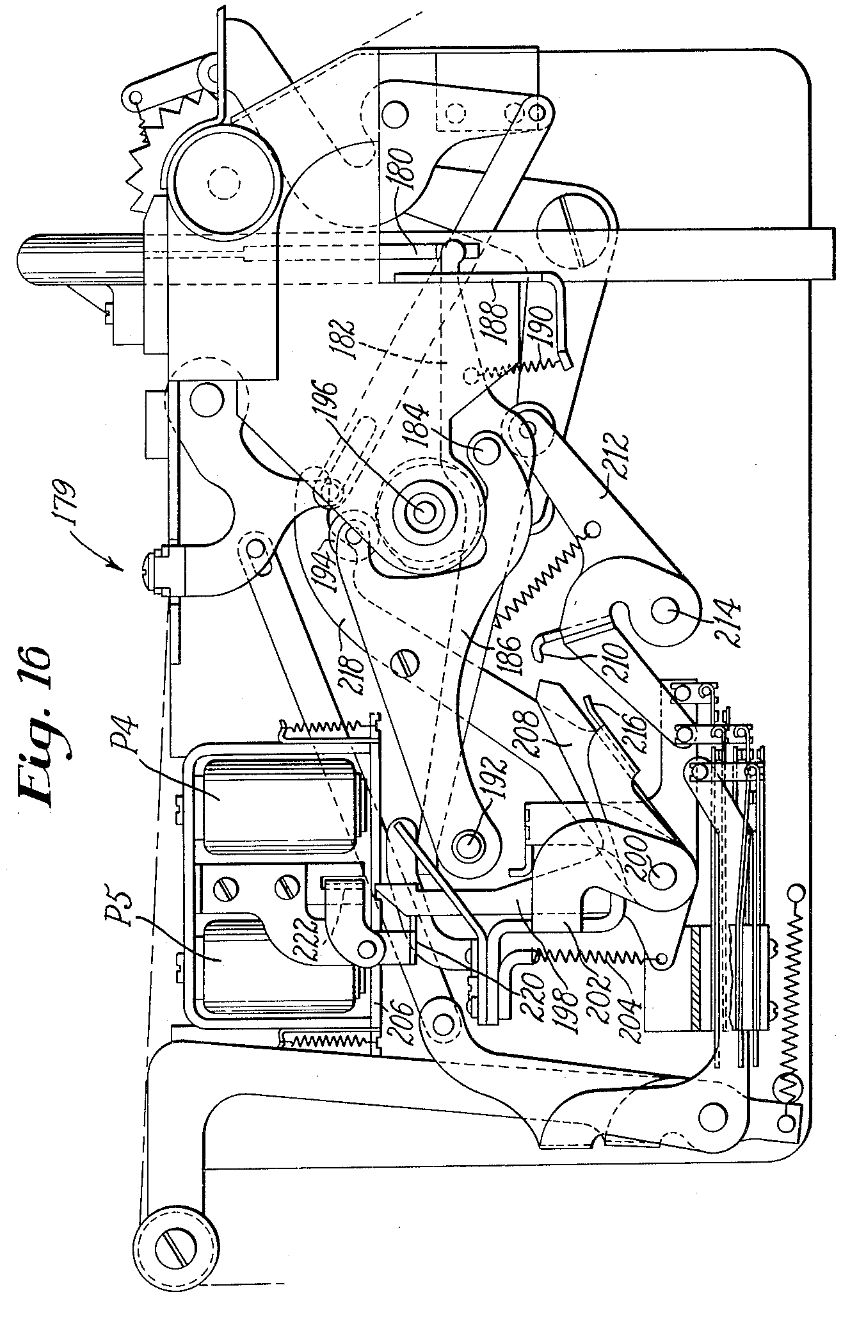

Fig. 16 is a side elevation of a typical tape punch.

The invention will now be described by way of example in its application to the sensing and reproduction of perforated data from a type of merchandise tag illustrated in Fig. 9. As therein illustrated, the tag is provided with a plurality of punched information index point positions arranged in twenty-nine columns of four punch positions. A row A of twelve vertical columns, each having five possible positions A1 to A5, is arranged adjacent the upper end of the tag with another row B of twelve additional columns in line and directly below the columns of row A. Five additional columns are provided adjacent the lower end of the tag. The code used for punching data in the tag is a well-known two out of five modified binary code. The code with corresponding digital values is illustrated in Fig. 10. The tag is also provided with three locating and feed holes of relatively large diameter arranged in fixed positions relative to the data indicative perforations.

A typical perforated tape into which data sensed from the tag may be reproduced is illustrated in Fig. 11. The corresponding digital and control values of each column of the tape is also indicated. It should be understood, however, that other codes may be utilized on such tapes and that the scope of the invention also includes the recording of the data sensed from a tag into a record card.

Figure 1:
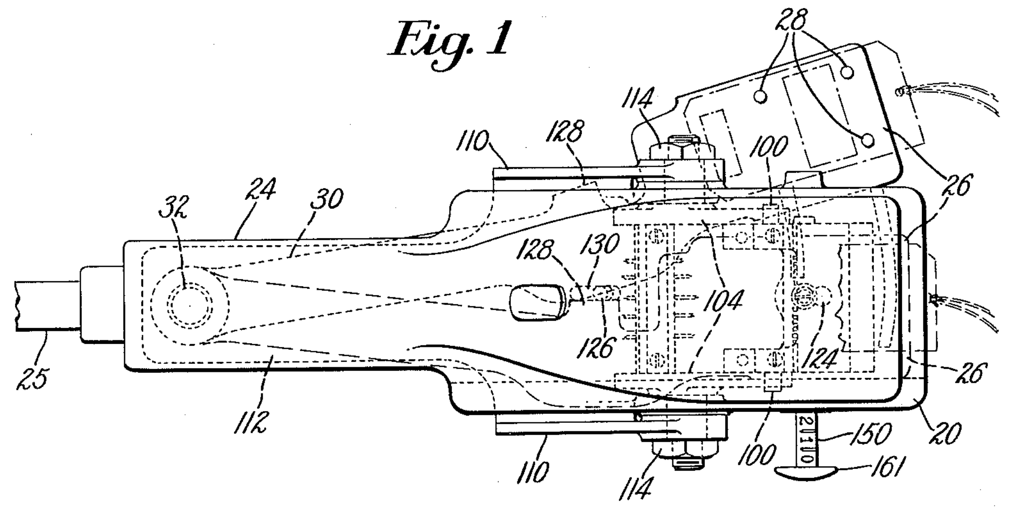
Fig. 1 is a plan view of a hand-held sensing device in which the invention is embodied.

The hand-held device for reading the data indicative perforations in a record such as in the above-mentioned tags is illustrated in Figs. 1 to 8. As illustrated, the device is provided with a casing 20 (Figs. 1 and 2) which encloses and isolates the mechanical and electrical elements of the hereinafter described sensing instrumentalities. The casing has secured to its lower and open side a base member 22 so that the casing and base member form an enclosure to exclude extraneous material from the sensing elements. For convenient handling by an operator the casing is provided with a handle 24. For positioning and locating a tag relative to the sensing instrumentalities to be described, the device is provided with a swingable tray 26 having locating pins 28 adapted to receive the locating holes in a record tag such as that illustrated in Fig. 9. So that the tag may be easily placed on the tray 26, the tray may be moved to an exposed loading position as illustrated in Fig. 1, the sensing position of the tray being indicated in dash lines. The tray 26 is formed on one end of an arm 30 which is mounted for swinging movements on a headed stud 32 fixed in the handle 24, so that the tray may be swung from the tag loading position to the tag reading position where the data indicative perforations of the tag are accurately alined with the sensing instrumentalities of the device. The tray is also provided with a depending tab 34 which enables the operator to swing the tray from its loading position to its reading position where one edge 36 of the tray abuts a shoulder 38 (Figs. 3 and 4) formed on the base member 22. A shelf 40 supports the tray and is fixed to the underside of the base member by screws.

Figures 3, 4:
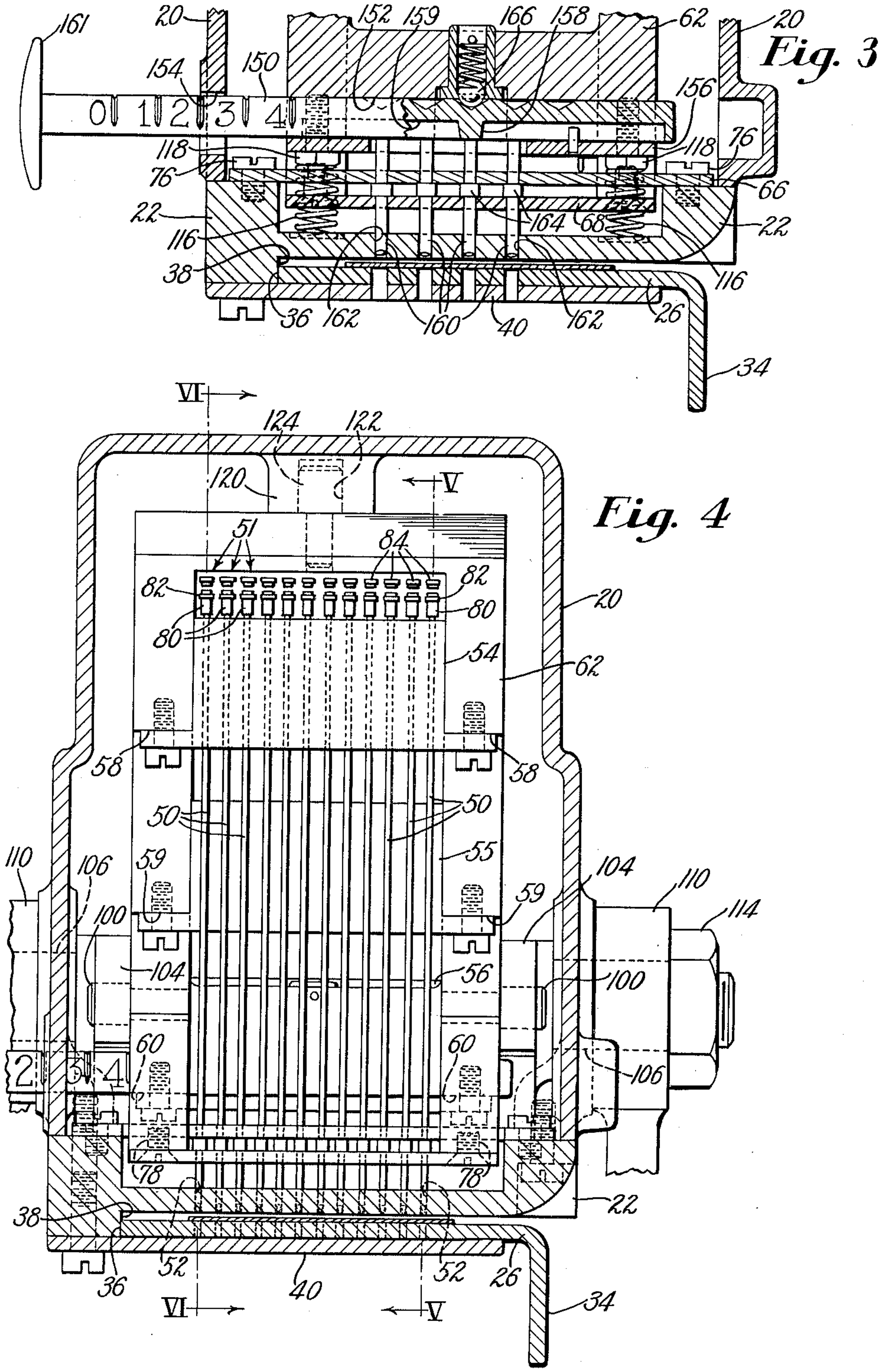
Fig. 3 is a section in enlarged scale on line III—III of Fig. 2.
Fig. 4 is a section in enlarged scale on line IV—IV of Fig. 2.

For sensing the data indicative perforations in a tag resting on the tray, the sensing device is provided with a plurality of spaced sensing pins 50 and associated sensing contacts 51 (Figs. 4 and 6) arranged in rows and columns corresponding to the rows and columns of all possible data indicative perforations in the record tags. The sensing pins at their lower ends are slidably mounted in spaced bores 52 in the base member 22. The upper ends of the pins are mounted for sliding movements in blocks 54, 55 and 56, which are secured to surfaces 58, 59 and 60, respectively, of a U-shaped frame 62. Adjacent their lower ends, the pins are each provided with a portion 64 (Figs. 5 and 6) of enlarged diameter which fits between two plates 66 and 68. The plates 66, 68, are provided with holes 70 and 72, respectively, which allow the pins, excepting the enlarged portions 64, to pass freely through the plates. The plate 66 engages the upper side of the portions 64 of the pins and is secured to the base member 22 by screws 76 (Fig. 3). The plate 68 engages the lower sides of the portions 64 and is secured to the underside of the frame 62 by screws 78. The upper ends of the sensing pins are provided with heads 80 of insulating material adapted to rest against the underside of individual lower spring contacts 82 of the contacts 51 for a purpose which will presently appear. Each lower spring contact has associated therewith an upper leaf contact 84, the contacts being biased in open positions when the frame 62 and the sensing pins are in their upper retracted positions as indicated in Fig. 6.

Figures 5, 6:
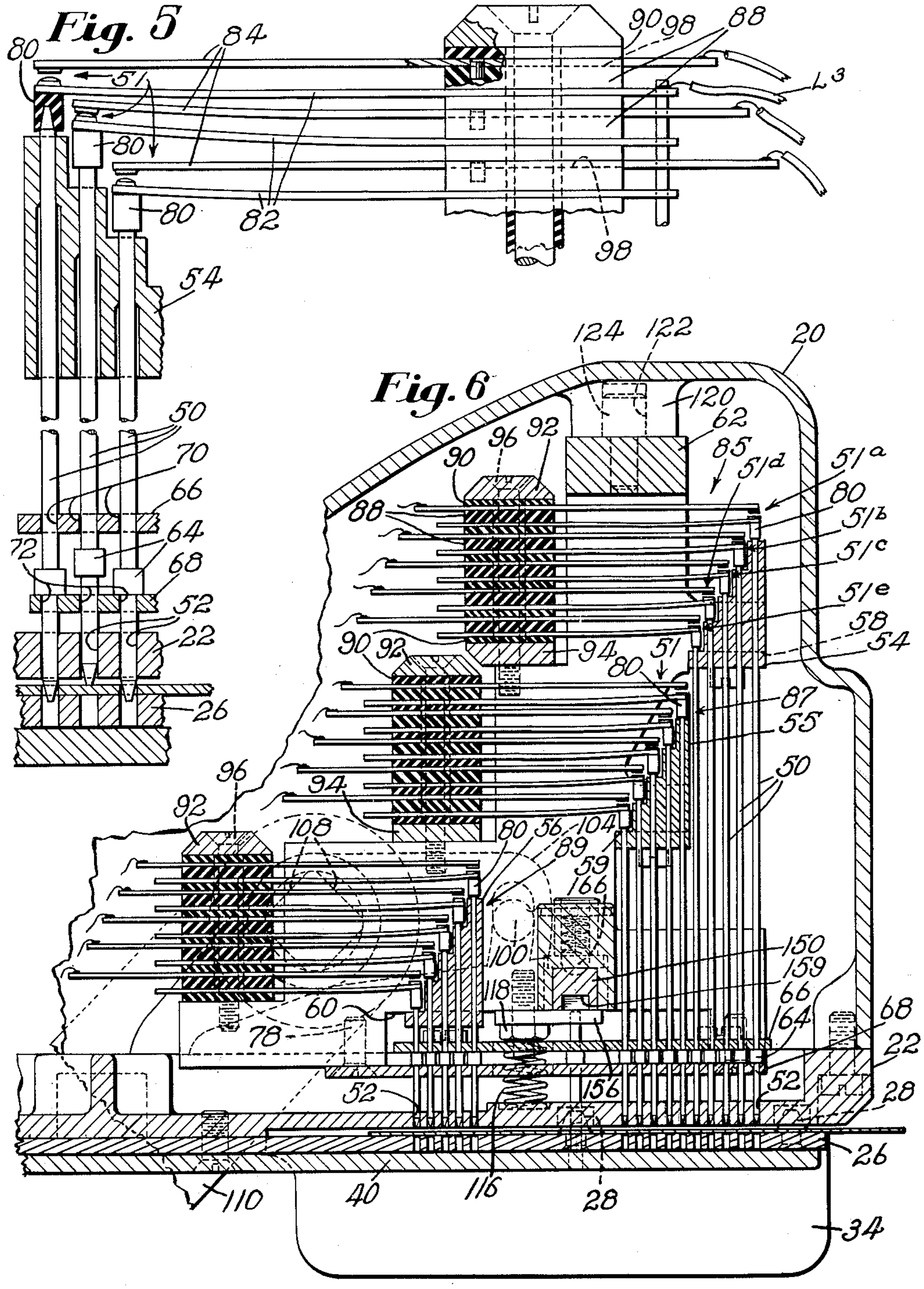
Fig. 5 is a partial section on line V—V of Fig. 4.
Fig. 6 is a section on line VI—VI of Fig. 4.
Figures 7, 8:
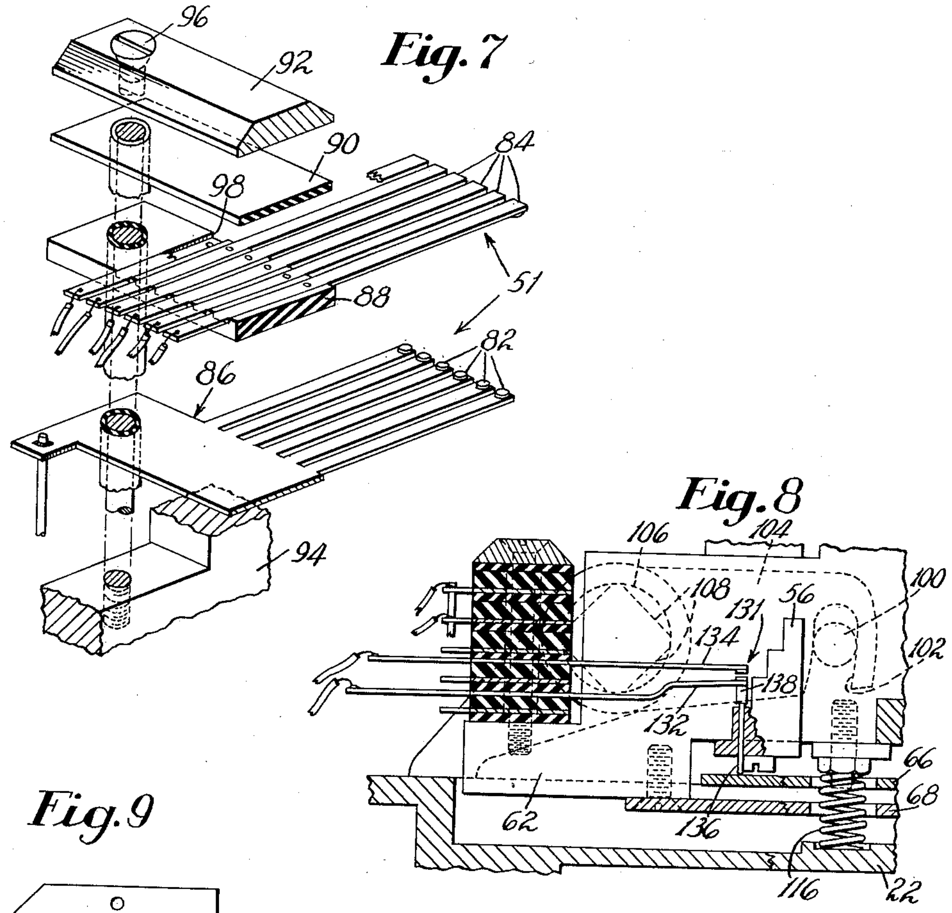
Fig. 7 is an exploded perspective view illustrating the mounting of the sensing switches.
Fig. 8 is a side elevation illustrating the head closing switch.

As may be seen in Fig. 6 the rows of sensing pins are of different lengths so that the upper ends of the rows are arranged in a step-like relation to allow for compact yet sturdy mounting of the sensing contacts. The sensing pins and associated contacts are further arranged in groups 85, 87 and 89. Groups 85 and 87 are adapted to sense the data perforated in rows A and B (Fig. 9) respectively of the tag while group 89 is adapted to sense the five additional columns at the lower end of the tag. By way of illustration, the sensing pins and contacts of group 85 (Fig. 6) include five rows of contacts **51*a* to 51*e* which are adapted to sense the positions A1 to A5 (Fig. 9) respectively of the row A of the tag. The lower spring contacts 82 for each row are joined together at one end forming a comb-like member 86 (Fig. 7). The members 86 are arranged in groups, with the members being held firmly between a series of insulating spacers 88 and separators 90 which are secured to the frame member 62 by header blocks 92, 94 and screws 96. The upper leaf contacts 84 are individually held in grooves 98 in the insulating spacers 88 so that each upper contact is electrically isolated from its associated lower contact 82 and from the other upper contacts. The lower spring contacts 82 act on the insulating heads 80 to urge the sensing pins down so that the lower ends of the enlarged portions 64 of the pins are held against the plate 68**.

Figure 2:
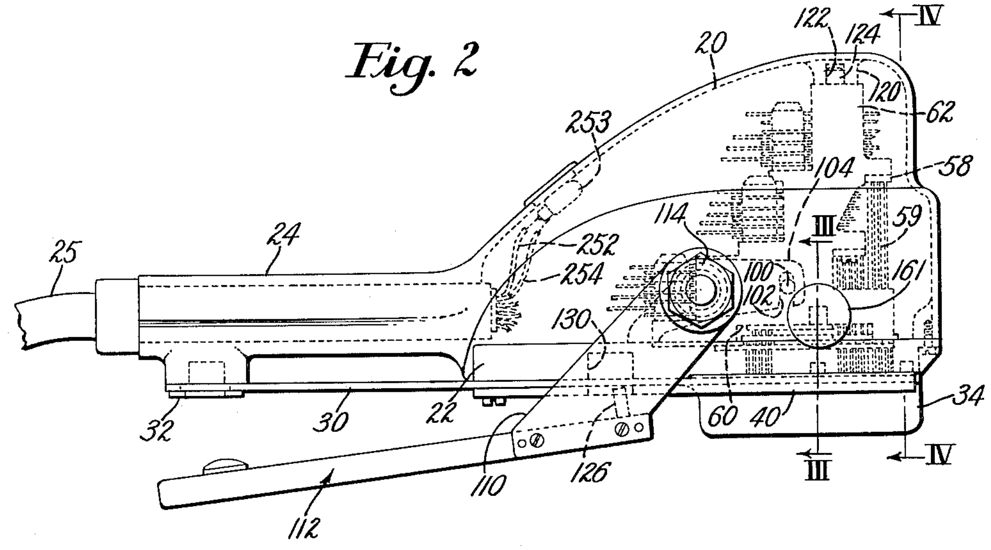
Fig. 2 is a side elevation of the sensing device.

For moving the frame 62 and hence also the sensing pins 50 downwardly as a unit to sense the data indicative holes in a tag resting on the tray 26, the frame 62 is provided at opposite sides with two pins 100 adapted to be received in slots 102 of a pair of arms 104 which have cylindrical portions 106 bearing in and extending outwardly through the sides of the casing 20. The outer ends of the cylindrical portions 106 have four flats 108 (Fig. 8) adapted to be received in mating square holes in two arms 110 of a movable handle 112. Outside of the arms 110, the portions 106 are threaded and receive nuts 114 which secure the arms 104 and 110 together so that when the handle 112 is moved by the operator, i.e., is swung upwardly as seen in Fig. 2 toward the handle 24, the arms 104 are swung downwardly. For maintaining the frame 62 in its upper and non-sensing position, and by means of the plate 68 also maintaining the sensing pins in their upper retracted positions, a pair of compression springs 116 (Figs. 3 and 6) at their lower ends bear against the base member 22, and at their upper ends rest against guide screws 118 threaded into the underside of the frame 62. The frame 62 is thus biased to its upper position with its upper side against a boss 120 in the casing. The boss is provided with a bore 122 which slidably receives a pin 124 in the upper side of the frame 62 for guiding the upper end thereof during its heightwise movements. Thus, it may be seen that by squeezing the two handles 24 and 112 together, the arms 104 are moved down until the pins 100 are engaged by the upper ends of the slots 102 in the arms. During this initial movement of the arms 110 a pin 126 (Fig. 2) in the handle 112 is moved through a clearance hole in the shelf 40, past a boss 128 (Fig. 1) on the arm 30 of the tray 26 and into a clearance hole 130 in the base member 22. It should be obvious from Fig. 1, that the pin 126 would strike the arm 30 of the tray and prevent effective movement of the handle 112 whenever the tray is displaced from its sensing position. Upon further movement of the arms 104, after engagement of the upper ends of the slots 102 with the pins 100, the frame is moved down against the action of the springs 116, thus also moving the sensing pins 50 downwardly through the base member 22. Since a two out of five bit code is utilized on the tag, at least two pins 50 in each column pass through perforations in the tag resting on the tray 26 while three of the pins in each column are stopped or displaced relative to the frame 62 by unperforated portions of the tag as illustrated in Fig. 5. In this manner the lower spring contacts 82 associated with the displaced sensing pins are caused to close with their associated upper contacts 84 which continue to move downwardly with the frame 62. As seen in Figs. 6 and 7, the lower spring contacts 82 are electrically connected to each other and to a common source of positive voltage later to be described, while each of the upper contacts 84 is individually connected by appropriate wiring to an individual element of electrical circuits for a purpose which will presently appear. Thus, it may be seen from the foregoing that for each perforation sensed a corresponding pair of contacts remain open while for each position of the tag where there are no perforations corresponding contacts will be closed.

For initiating the operation of the electrical control circuits to be described, the sensing unit is provided with a pair of contacts 131 comprising a lower contact 132 and an upper contact 134 (Fig. 8) carried by the frame 62 in a manner similar to the upper sensing contacts 84. As illustrated, a special pin 136 is slidably mounted in the block 56 and is provided at its upper end with an insulating block 138 which engages the lower contact 132. The lower end of the pin 136 is adapted to engage an unperforated portion of the plate 66. Thus, whenever the frame 62 is moved downwardly to move the sensing pins into engagement with a tag, the pin 136 is displaced to close the contacts 132, 134.

It is sometimes advantageous when reading tags by means of the portable reader, to perforate the tag as an indication that the tag has been sensed. To this end a gag bar 150 (Fig. 3) is slidably mounted in a slot 152 provided therefor in the frame 62, one end of the bar passing through a clearance hole 154 in the casing 20. To retain the bar in the slot and to form a lower bearing surface for the bar, a retaining strap 156 is secured to the underside of the frame by the guide screws 118. The bar 150 is provided with a gag lug 158 within a clearance slot 159, the lug being adapted to engage selectively the upper end of one of four punches 160 which are guided at their lower ends by bores 162 in the base member 22. The punches are provided with enlarged portions 164 which fit between the plates 66 and 68 in the same manner as do the enlarged portions 64 of the sensing pins 50. With the exception of the enlarged portions, the punches pass freely through the plates 66 and 68. The tray 26 and the shelf member 40 are also provided with holes alined with the punches to accommodate the material which is punched from the tag. The gag bar 150 is provided at its left end, as seen in Fig. 3, with a knob 161 and with indicia which indicate to the operator which punch is engaged by the gag lug 158. By sliding the bar 150 lengthwise in the slot 152, the operator may gag any one of the punches 160 at will as indicated by which of the indicia numerals is alined with the side of the casing 20. To ensure that the gag lug 158 is alined properly with any selected punch, the upper surface of the bar 150 is provided with spaced depressions each adapted to receive a spring pressed ball 166 when the lug is properly positioned over a punch. It should be apparent that when the handles 24 and 112 are squeezed together by the operator causing the sensing pins to sense the perforations in a tag, the downward movement of the frame 62 carrying with it the gag bar 150 also will cause only one of the punches 160 to be forced through the tag resting on the tray. The remaining punches are stopped by the tag surface and are not forced downwardly through the tag due to the clearance slot 159 adjacent the lug 158 in the gag bar above these punches. During the upward movement of the frame 62 when the handles are released by the operator the plate 68 engages the lower surfaces of the enlarged portions 64 of the sensing pins 50 and the portions 164 of the punches raising the punches and the sensing pins from the tag to their initial positions as indicated in Fig. 6.

The tape punching mechanism indicated generally as 179 in Fig. 16, is of the type shown in United States Patent No. 2,540,029, granted January 30, 1951 to Hamilton et al. The punching mechanism includes six punches 180 for punching the rows of perforations across a tape, one punch for each of the five channels across the tape which are used in combinations to encode the data sensed from the tag and one for punching the feeding holes. Each operation of the tape punching apparatus in addition to causing the punching of the encoded data also causes a feed hole to be perforated in the tape. These feed holes assist in feeding the tape through the punching apparatus and also through a sensing means which may be utilized subsequently to analyze the punched data encoded on the tape.

The manner in which the punches are selected and operated will now be explained with reference to Fig. 16. Each punch 180 is pivotally connected to the right end of an actuating lever 182 which is pivoted intermediate its ends on a rod 184 in an actuating frame 186. The right ends of the levers 182 are guided in a comb plate 188 and are urged downwardly by springs 190. The actuating frame 186 is pivoted at 192 and has rollers 194 which engage cams on a cam shaft 196 to rock the actuating frame 186 to raise and lower the rod 184 upon which the actuating levers 182 are pivoted.

The effectiveness of the acutating levers to operate the punches is controlled by a plurality of magnetically controlled punch selecting levers 198 which are pivoted on a rod 200 carried by a bracket 202 and which are urged clockwise by springs 204. The selecting levers 198 are normally retained in their retracted or non-effective positions, as shown in Fig. 16, by notches in the armatures 206 of punch selecting magnets, such as P4 and P5. When any one of the levers 198 is in its retracted position, it is out of engagement with the left end of the corresponding actuating lever 182 and this end is free to rise when the frame 186 raises the rod 184 causing the actuating lever to pivot about its right end, the right end of the actuating lever being loaded by the spring 190. In such an operation, the punch 180 will not be operated to punch the tape.

When a punch selecting magnet, such as P4 or P5, is energized it moves its armature 206 away from the corresponding punch selecting lever 198, freeing the lever 198 for clockwise movement under the influence of the spring 204 until the end of the selecting lever engages the left end of the corresponding actuating lever 182, to prevent the left end from rising when the actuating frame 186 raises the rod 184. Since the left end of the actuating lever is held by the punch selecting lever against upward movement, the spring 190 will yield when the frame 186 is rocked and the right end of the actuating lever 182 and the punch 180 will be forced upwardly to perforate the tape. One or more punch selecting magnets may be energized in each punching operation according to the encoding of the symbol or numeral being punched. Each of the selecting levers 198 has a forwardly extending portion 208 with which a locking plate 210 can engage. The plate 210 is carried by a lever 212 which is pivoted on a rod 214 and is operated by a cam on the shaft 196 to lock the levers during the punching portion of the operation of the punching mechanism. When operated, the plate 210 engages the forwardly extending portions 208 of the selecting levers to lock those levers in normal position which have not been released by the punch selecting magnets and to lock those levers which have been released to select their related punches for operation. The forwardly extending portions 208 of those levers which have been released and have rocked downwardly will engage a restoring plate 216. The plate 216 is pivoted on the rod 200 and is rocked counterclockwise by a cam actuated arm 218 near the end of the punching operation. In order to insure that the selecting levers will be properly restored to the control of the punch selecting magnets, the restoring plate 216 provides a slight overthrow movement to the levers and one of the levers engages a flange 220 on one arm of a bail 222 to rock the bail clockwise forcing all the armatures away from the magnets and into engaging relation with the selecting levers. The punching mechanism is driven by a motor (not shown) which is constantly rotating whenever the tape punch is operable. The motor is connected to the cam shaft 196 through a clutch and suitable gearing, also not shown. The clutch is actuated to cause one revolution of the cam shaft by a clutch trip magnet PC, shown only diagrammatically in Fig. 13. Also mounted on the cam shaft 196 are two cams 224 and 226, shown only in Fig. 13. These cams are adapted to cause opening and closing of electrical contacts PC1 and PC2 in timed relation for a purpose which will presently appear.

The operation of the sensing unit and the tape punch will now be described with particular reference to the wiring diagrams illustrated in Figs. 12 to 15. The wiring diagram for the various circuits extending from the sensing unit to the tape punch is generally illustrated in Figs. 12 and 13 taken together. For simplification, only the group 85 (Figs. 6 and 12) of the sensing contacts is illustrated, it being understood that the groups 87 and 89 are similarly arranged. The control circuits include a stepping switch of well-known type having six electrically isolated banks of contacts which are diagrammatically illustrated in Fig. 12 as S1, S2, S4, S7, SK and SC. Each bank is provided with fifty-two contacts arranged to be successively engaged by an individual stepping arm. All stepping arms although electrically isolated are mechanically connected to operate in unison. In operation, when energized, a stepping magnet SM (Fig. 13) cocks the stepping mechanism, not shown, and upon de-energization of the magnet the stepping arms are stepped to the next contacts in a clockwise direction as indicated on Fig. 12. The stepping magnet SM also has associated therewith two pairs of normally closed contacts SM1 and SM2 which are opened when the magnet is energized for purposes which will subsequently appear.

Also associated with the stepping switch is a cam actuated switch S9 (Fig. 13.) having two alternate contacts S9*a* and S9*b* and a contact arm 249. When the system is at rest, the contact arm 249 of the switch S9 is on the contact S9*a*, but as soon as the stepping switch arms are stepped to their first contact positions the arm 249 is transferred to the contact S9*b* where it remains throughout the successive operations of the stepping switches until the termination of operation. Each of the fifty-two contacts in each bank is individually wired to the various elements of the electrical control system. As indicated, the stepping arms are in their at rest position hereafter referred to as position S152, S252 etc.

The stepping arms of the banks S1 through S7 and SK are individually connected to the control grids of five thyratrons T1 through T7 and TK, respectively. The cathodes of the thyratrons are connected to ground. The plates of the thyratrons are individually connected to one side of relays R1, R2, R3, R4 and R5, respectively. The electrical system is also provided with a plug board 250 (Fig. 13) which permits a flexibility of operation which will subsequently appear. Power is supplied to the various circuits of the system from a power supply unit which may be of any suitable type as long as the various voltages indicated are provided. A number of additional relays R6, R7, R8 and R10 are provided for control purposes which will appear as the description of the operation of the system progresses.

The first twenty-nine contacts of each of the banks S1, S2, S4, S7 and SK are each individually associated with individual groups of capacitors C1, C2, C4, C7 and CK. For example the first contact S11 of the bank S1 is connected to the left-hand terminal of the capacitor C1*a* of the group C1 whose right-hand terminals are grounded. Each of the successive contacts up to S129 is similarly individually connected to the left-hand terminal of successive capacitors of the group C1. Each contact of each bank is similarly connected to an individual capacitor of an associated group.

As illustrated, each sensing contact of the row 51*a* is individually connected to the left-hand terminal of an individual capacitor of the group C1. Thus the first sensing contact on the left in Fig. 12 in the row 51*a*, is connected to the left-hand terminal of the first capacitor C1*a* of the group C1, the first contact S11 of the stepping bank S1 also being connected to this same terminal. Each successive sensing contact of row 51*a* is also connected to successive individual capacitors of the group C1 while successive contacts of the switching bank S1 are also connected to the same successive capacitors. The other rows of sensing contacts 51*b*, 51*c*, 51*d*, 51*e*, are connected in the same manner to groups of capacitors C2, C4, C7 and CK, respectively, the first twenty-nine switching contacts of the bank S2, S4, S7 and SK also being connected to corresponding capacitors in the same manner. One of each pair of the sensing contacts is connected in common through a line wire L3 and normally open relay contacts 6*a*5 to a positive 50 volt lead of the power supply.

The system is also provided with four double-throw switches E1, E2, E3 and E4 which may be actuated in case of error with one manual operation, there being a mechanical connection between the switches. These switches, hereinafter called "error switches," are normally in the positions illustrated in Fig. 13 and are only operated for error operation as will be subsequently described.

The starting conditions for the system are as follows: The stepping arms of each bank of the stepping switch are in positions S1–52, S2–52 etc. previously referred to. The relays R7 and R10 are energized and the relays R1 to R5, R6 and R8 are de-energized. A lamp 253 (Fig. 2) in the reading head is lit.

The operator places a tag on the tray 26 (Fig. 1) and moves the tray into sensing position. The operator, by squeezing the handles 24 and 112, causes the sensing pins 50 to move perpendicularly of the tag to detect the perforations in the tag in all columns, and where there are, as is usual, two such perforations, such movement causes three of the sensing contacts 51 associated with each column to be closed while two of the contacts remain open. Simultaneously, the contact 131 (Figs. 8 and 13) is also closed causing the relay R6 to be energized by closing a circuit from a line wire L1 through the contacts 131 and relay R6 to ground, L1 being connected to a positive 100 volt lead from the power supply. The energizing of relay R6 opens the normally closed contacts 6*b*2, thus de-energizing relay R7 and also closes the normally open contacts 6*a*5, thus applying positive 50 volts from the power supply to one of each pair of the sensing contacts 51 and, through those sensing contacts which have been closed, also charging corresponding capacitors in each of the groups C1, C2, C4, C7 and CK. Thus for each of the perforations in the tag a corresponding capacitor is not charged while for the absence of a perforation in a data indicative position, a corresponding capacitor is charged. As previously stated the first sensing contact of each of the rows 51*a* through 51*e* corresponds to the five possible positions of the first column on the tag. Assuming that the digit 3 is recorded in the first tag column, there will be perforations in positions A1 and A2 (Fig. 9). Thus the associated contacts 51*c*, 51*d* and 51*e* would be closed causing the first capacitor in each of the groups C4, C7 and CK to be charged, while the first capacitors in the groups C1 and C2 are not charged. For each of the successive columns on the tag capacitors indicative of the digits recorded therein will be charged in the various capacitor groups. Thus all groups of capacitors taken together form a means for storing the complete data sensed from the tag.

When relay 7 is deenergized as above noted, normally closed contacts 7*b*4 (shown in Fig. 12 as adjacent the power supply) are opened, opening a circuit from the power supply through these contacts, through a wire 252, the lamp 253 in the reading head and back through a wire 254 to the power supply thus extinguishing the lamp, thereby indicating that the tag has been sensed and the information stored in the capacitors. Also when the relay R7 is deenergized, the normally closed contacts 7*b*3 close energizing the stepping magnet SM from the line wire L1, the contact S9*a* of the switch S9, the normally open contacts 6*a*3 (which closed when relay R6 was energized) contacts 7*b*3, the contacts 10*a*3, (which are closed at this time, due to the original energization of relay R10) and through the magnet SM to ground. In this manner, the stepping mechanism for the stepping switch is cocked but the stepping arms remain on positions S1–S2 etc.

The operator then releases the handles 24 and 112 of the reading head causing the contacts 131 to open, deenergizing the relay R6, thus opening the contacts 6*a*5 (Fig. 12) and 6*a*3 (Fig. 13), thereby interrupting the supply of voltage from the power supply to the sensing contacts to leave a pattern of charged capacitors and deenergizing the stepping magnet SM to cause the stepping arms in each bank to step to the first contacts corresponding to S11 of bank S1. In this position of the stepping arms, each left-hand terminal of the first capacitors C1*a*, C2*a*, C4*a*, C7*a* and CK*a* in the capacitor groups is connected to a tap on a voltage dividing network extending from a wire L2 (−75 v.) to ground. Other taps on the networks are connected to the control grids of the thyratrons T1, T2, T4, T7 and TK respectively. Thus in the example previously stated, the first capacitors in the groups C4, C7 and CK discharge through their corresponding stepping switch banks and voltage dividing networks to make the control grids of the thyratrons T4, T7 and TK less negative so that these thyratrons fire. This causes the relays R3, R4 and R5 to be energized from ground through their respective thyratrons through a common wire 256, through the error switch E1, contacts 10*a*4, which are closed at this time, and through the line wire L1 to the positive 100 volt terminal of the power supply. Since the first capacitors of the groups C1 and C2 were not charged, the corresponding thyratrons T1 and T2 were not fired since their control grids are biased sufficiently negative by their connections including the wire L2 to a negative 75 volt terminal of the power supply. Referring to Fig. 14, it may be seen that the relays R1 through R5 control the selection of a number of circuits in a decoding unit 258. Since the relays R3, R4 and R5 are energized under the aforesaid circumstances, the relay switches associated with these relays are transferred to their upper positions while the relay switches for the relays R1 and R2, which are not energized, remain in their lower positions. In this manner, a single circuit is closed from a wire 259 through non-transferred contacts associated with relays R1 and R2 and through transferred contacts associated with relays R3, R4 and R5 to a wire 263 which is indicative of the digit 3 sensed in the first column of the tag. It will be understood that for other combinations of energized and nonenergized relays that other wires 260 through 269 would be selected indicative of corresponding digits 0–9. As soon as any of the relays R1 through R5 are energized, the relay R10 is de-energized due to opening of at least three of the normally closed contacts R1*b* through R5*b* (Fig. 13) operated by the relays R1 through R5.

When the stepping arm of the switch bank SC steps to the first contact SC1, a positive voltage is applied to the wire 259 of the decoding unit 258 from the line wire L1, the contact S9*b* of the switch S9, through the cam actuated switch PC1 which is held closed by the cam 224 through 0–90° of operation of the cam shaft of the tape punch 179, through a wire 270, the normally closed contacts SM2 and 7*b*6 to the stepping arm of the bank SC, through the first switching contact SC1, through a corresponding position PB1 of the plug board 250, through a jumper wire to the position PB30 of the plug board. From the position PB30, the voltage is conducted through a wire 272, the error switch E2, normally closed contacts 10*b*2 (which closed upon de-energization of relay R10), and normally closed contacts 8*b*4 to the wire 259. Since the digit 3 is being indicated, a circuit is closed as previously described through the decoder unit 258 from the wire 259 to the wire 263. The wire 263 leads into an encoding unit 273 and is connected through a diode to a wire 274, see also Fig. 14, which leads through the punch magnet P1 to ground. A tap wire also leads from the wire 274 through a diode and through the tape punch clutch magnet PC to ground. As soon as the magnet PC is energized, the clutch mechanism of the tape punch is tripped, commencing operation of the tape punch and since the punch magnet P1 is energized, a hole will be punched in the first channel of the tape recording the digit 3 sensed from the first column of the tag.

As previously described, the tape punch shaft makes one complete cycle for each actuation of the clutch mechanism. During this time, the cam 224 holds the switch PC1 in closed condition from 0–90° of the cycle and thereafter causes the switch to remain open until the end of the cycle. The cam 226 maintains the switch PC2 in open condition from 0–90° of the cycle and thereafter maintains the switch in closed condition until the end of the cycle, whereupon the switch PC2 opens. Thus, as soon as the cams reach the 90° point in the cycle, the cam switch PC1 opens, removing voltage from the stepping arm of the stepping switch bank SC, hence also opening the circuit to the decoder, de-energizing the punch magnets P1 through P5 and the punch clutch magnet PC. Also at 90° of the cycle time the cam 226 closes the switch PC2 closing a circuit to the relay R8 through a wire 290, normally closed contacts 7*b*1, 10*b*1 and SM1 and through the relay R8 to ground. The energized relay R8 locks in through contacts 8*a*1 and SM1 and opens the normally closed contact 8*b*3, opening the B+ circuit from L1 through the relays R1 through R5 to the plates of the thyratrons T1 through TK, thus extinguishing the thyratrons and allowing the control grids thereof to regain control of conduction by the tubes. The control grids are at this time biased sufficiently negative to hold the thyratrons nonconductive, all charges of the capacitors having by this time been completely discharged through the resistors of the aforesaid networks. All the relays R1 through R5 are thus de-energized allowing the normally closed switches R1*b* through R5*b* to close energizing the relay R10 from the wire L1. When relay R10 is energized, the contacts 10*a*4 close to re-establish plate voltage in the plate circuits of the now nonconductive thyratrons through the relays R1 to R5.

Since both relays R8 and R10 are now energized, the stepping switch magnet SM is again energized through the contacts 8*a*2 and 10*a*3 to cock the stepping switch. As soon as the magnet SM is energized, the normally closed switch SM1 in the R8 holding circuit is opened de-energizing the relay R8, thus opening the contacts 8*a*2 and de-energizing the magnet SM and hence causing the stepping arms to step to the next succeeding stepping switch contacts. The second capacitors in each group are thereby connected through their respective stepping banks to control the bias on the grids of the thyratrons causing the thyratrons to fire selectively according to the charge condition of the capacitors. The appropriate relays R1 through R5 once again are energized by firing of the thyratrons thereby selecting the appropriate circuits in the decoder and causing the tape punch to perforate the tap in accordance with the data that was previously sensed from the second column of the tag and stored in the capacitors. As soon as the tape punch has completed its previous cycle and the cam switch PC2 is open, the relay R10 is once again de-energized upon energization of any of the relays R1 through R5 with a resultant opening of some of the contacts R1*b* to R5*b*. The above described cycle of the system continues to repeat itself as controlled by the charges stored in the successive groups of capacitors and the stepping arms step to each of the successive contacts in the banks S1—SK.

To illustrate how some of the information recorded on the tag may be skipped and not be reproduced on the tape, each of the switching contacts SC1 through SC29 of the stepping switch bank SC is individually connected to individual outlets PB1–PB29 in the plug board. By way of example, assume that column 21 of the tag is to be skipped and not recorded in the tape. Since the switching contact SC21 corresponds to column 21 of the tag, the outlet for this column on the plug board, namely PB21, is not connected by a jumper wire to the outlet PB30 but instead is connected individually by a jumper wire to a skip outlet PB31. Thus when the stepping arm of the bank SC arrives at the contact SC21, a circuit is completed from the stepping arm of the bank SC through the plug board to the error switch E4 through the normally closed contacts 10*b*4 and SM1 to energize the relay R8. At the same time, some of the thyratrons were fired to energize at least three of the relays R1 through R5 to open some of the contacts R1*b* through R*b*4, de-energizing the relay R10 allowing the contact 10*b*4 to close and complete the circuit to the relay R8. The tape punch, however, is not actuated at this time since there is no electric energy supplied through the wire 259 leading to the decoder due to the outlet PB21 of the plug board being connected to the outlet PB31 rather than to the outlet PB30 as illustrated in Fig. 13. When the relay R8 is energized, the circuit to the plates of the thyratrons is opened since both contacts 8*b*3 and 10*a*4 are open thus de-energizing the relays R1–R5. The circuit through the contacts R1*b* through R5*b* is once again restored energizing the relay R10 and causing the stepping switch magnet SM to be energized through the contacts 8*a*2 and 10*a*3. The contacts SM1 once again are opened de-energizing the relay R8, opening the contacts 8*a*2 and de-energizing the magnet SM allowing the stepping arms to step to the next contacts. In this manner, the data sensed from column 21 of the tag is skipped and not recorded on the tape. The cycle continues as before with the stepping arms successively transferring the charges from corresponding capacitors to the thyratrons causing them to fire in accordance with the data stored and also causing the tape punch to record the successive data on the tape. This cycle continues automatically until the thirtieth position corresponding to contact SC30 of the bank SC on the stepping switches has been reached whereupon the stepping switch is caused to step to successive positions without recording any information on the tape since there is none available on the capacitors. These positions of the stepping switches S1, S2, S4, S7 and SK are wired in common to ground and therefore cannot cause the thyratrons to fire. These positions on the bank SC, however, are wired in common through a wire 292 to the stepping switch magnet SM through the contacts 10*a*3. These contacts remain closed since the relay R10 remains energized throughout this portion of the cycle. Thus the stepping switch operates self-interrupted because as soon as the magnet is energized the contacts SM2 are opened breaking the circuit to the stepping arm of the stepping switch SC.

This operation repeats until the stepping arms reach their forty-fifth positions indicated as SC45 in the bank SC and as S145 in the bank S1. This position and the next two positions on the stepping switch banks are reserved for keyboard entry. These positions of the bank SC are individually wired to plug board positions PB45, PB46 and PB47 which in turn are connected by jumper wires to an outlet PB40. This outlet is wired directly through a diode to the relay R7. Thus when the stepping arm steps to contact SC45 the relay R7 is energized. Contact 7*b*4 is thereby opened extinguishing the light 253 on the reading head, indicating to the operator that the keyboard entry may be made.

The wiring of the keyboard is diagrammatically illustrated in Fig. 15. As illustrated, the keyboard is provided with three columns 293, 295, and 297 of ten keys each, the three columns being individually associated with the forty-fifth, forty-sixth and forty-seventh contacts, respectively, of the banks S1 through SK. The column 293 of keys has associated therewith five wires 305, 306, 307, 308, and 309 which lead to the forty-fifth contacts of the banks S1—SK, respectively as seen in Fig. 12. The three poles of each key of the column 293 are connected to these wires in the manner illustrated in Fig. 15. Thus, by way of example, if the first key of the column 293 is actuated to introduce the digit one, the wires 306, 307 and 308 are thereby connected to a wire 304 leading to a keyboard switch 320. The other key columns 395 and 297 are similarly wired but are associated with the forty-sixth and forty-seventh contacts of the banks S1—SK.

As soon as the operator has selected the desired key in each column, he closes the keyboard switch 320 which completes a circuit through a wire 322, contacts 8*b*6 and SM2, the wire 270, the cam swich PC1 to the line wire L1. In this manner, a positive voltage is led through the keyboard from the wire 304 and wires 306, 307, and 308 through the switching arms of the banks S2, S4 and S7 to the control grids of the thyratrons T2, T4 and T7, causing the thyratrons to fire and energize the relays R2, R3 and R4 selecting a circuit through the decoder to the wire 261 (Fig. 14). At the time that the relay R7 is energized another circuit was closed leading from the plug board outlet PB40 through the contacts 7*a*5 and error switch E2, the contacts 8*b*4 and 10*b*2 to the wire 259 and thence through the decoder to energize the appropriate punch magnets and the clutch magnet PC thereby causing the tape punch to record on the tape the digit one introduced by the first column of the keyboard. The cycle then proceeds in the normal manner except that relay R8 which is energized through the cam contact PC2 at 90° of the tape punch cycle remains energized through the contact 7*a*1 until the cam contact PC2 opens at the end of the cycle. In the previously described manner, the stepping switch magnet SM is energized and de-energized to cause the stepping arms to step to the forty-sixth contacts and record on the tape the digit set in the second column of the keyboard, the cycle for the third column of the keyboard being identical.

After the digit from the third column of the keyboard is recorded, the stepping arms step to position forty-eight which is scheduled to be skipped unless an error is detected. This position SC48 in the bank SC is wired through the error switch E3 to the stepping switch magnet SM through the contacts 10a3. In the usual manner the stepping arms are moved to the forty-ninth position SC49 of the bank SC which together with position fifty and fifty-one are reserved for a fixed data entry which in the tape punch code indicated in Fig. 11 may be for carriage return, line feed and figures shift. These positions on the bank SC are individually wired to positions PB49, PB50 and PB51, respectively, of the plug board. Each of these plug board positions is wired (through a diode to avoid a feedback) to one or more of plug board outlets PB52 through PB56 which in turn are individually wired to the punch magnets P1 through P5, respectively. Assuming that position forty-nine is to indicate carriage return, the plug board position PB49 is wired through a diode to the outlet PB55 and thence directly to the punch magnet P4. Thus through the contact SC49 a positive voltage is applied directly to the punch magnet P4 and to the clutch magnet PC causing the tape punch to perforate the code for carriage return. The plug board positions PB50 and PB51 are wired in a similar manner to the appropriate outlets PB52 through PB56 and thence directly to the corresponding punch magnets so as the stepping switch steps to positions SC50 and SC51, respectively, the tape punch is caused to punch the appropriate control data in the tape. When the stepping switch arms step to position fifty-two the cycle is completed and the system comes to rest having caused the data sensed from the tag together with data entered by the keyboard and fixed data entered via the plug board to be punched in the tape.

If at any one time during the reproduction of the data stored in the capacitors, less than or more than three of the relays R1 through R5 are actuated, the system will come to a stop with the lamp 253 remaining lit indicating to the operator that an error has been detected by the decoding unit. The system stops upon error detection since there is no completed circuit through the decoder to operate the tape punch. Upon such detection of an error, the operator then moves the error switches E1 through E4 to their alternative positions. In this manner the hub PB30 of the plug board is connected to the skip hub PB31 through the switches E2 and E4 causing the stepping switch magnet SM to be alternatively energized and de-energized in a self-interrupting fashion, skipping all remaining positions until position SC48 on the bank SC is reached. At this point a circuit is completed to the wire 321 and through the error switch E3 to the plug board position PB57 and through a diode to the outlets PB52, PB53 and PB55 directly to the appropriate punch magnets to cause the tape punch to perforate the tape in the error code indicated in Fig. 11. After the tape is punched with the error designation, the stepping arms step to the fixed data positions SC49 to SC51 causing the fixed data to be punched into the tape. Thereafter, the stepping arms advance to the final at rest positions. During the error operation, the thyratrons are prevented from firing by opening the plate circuits through the error switch E1.

For portability, the above-described control circuits together with the keyboard and tape punch unit may be suitably encased and mounted on wheels. The only connection between the hand-held sensing device and the control wiring and tape punch is a flexible cable 25 which extends from the handle 24 as illustrated in Figs. 1 and 2. By such an arrangement the sensing device and tape punch together with the controls connecting the two may be easily moved to areas remote from normal data processing equipment.

Having thus described our invention, what we claim as new and desire to secure by Letters Patent of the United States is:

1. A record sensing device of lightweight construction supportable in one hand of an operator for extended periods of time including a handle by which the device is held in one hand of an operator for carrying and presenting the device to individual records which remain attached to goods to which they relate, means engageable with a record to which the device is presented for sensing coded data designations therein, a support for registering with the sensing means a record which remains attached to said goods, and manually actuated means coacting with the handle for engaging the sensing means with the registered record.

2. A record sensing device of lightweight construction supportable in one hand of an operator for extended periods of time including a handle by which the device is held in one hand of an operator for carrying and presenting the device to individual records which remain attached to goods to which they relate, means engageable with a record to which the device is presented for sensing coded data designations therein, a support projecting from the device for receiving a record which remains attached to said goods, said support being movable from the projecting position to a reading position for registering the record with the sensing means, and manually actuated means coacting with the handle for engaging the sensing means with the registered record.

3. A record sensing device of lightweight construction supportable in one hand of an operator for extended periods of time including a handle by which the device is held in one hand of an operator for carrying and presenting the device to individual records which remain attached to goods to which they relate, means engageable with a record to which the device is presented for sensing coded data designations therein, a support projecting from the device for receiving a record which remains attached to said goods, said support being movable from the projecting position of a reading position for registering the attached record with the sensing means, manually actuated means coacting with the handle for engaging the sensing means with the registered record, and means acting between the support and the manually actuated means for preventing operation of the actuated means unless the support is accurately positioned in the reading position.

4. A device of lightweight construction supportable in one hand of an operator for extended periods of time for sensing records having locating holes in fixed relation to a field of code indications comprising a handle by which the device is held in one hand of an operator for carrying and presenting the device to individual records which remain attached to goods to which they relate, means for sensing the code indications on a record to which the device is presented, and a support having fixed pins projecting therefrom, said pins being receivable in the locating holes of a record which remains attached to the related goods for registering the code indicative field of the record with the sensing means.

5. A device of lightweight construction supportable in one hand of an operator for extended periods of time for sensing records having locating perforations in fixed relation to a field of code indications comprising a handle by which the device is held in one hand of an operator for carrying and presenting the device to individual records which remain attached to goods to which they relate, means for sensing the code indications on a record to which the device is presented, a support projecting from the device and having fixed locating pins extending therefrom, said pins being receivable in the locating holes of a record which remains attached to related goods, and means mounting said support for movement from the projecting position to a reading position for registering the field of code indications with the sensing means.

6. A data processing apparatus comprising a storage unit having a plurality of electrically operated storage devices and a record sensing device remote from said storage unit and of lightweight construction supportable in one hand of an operator for extended periods of time, said device including a handle by which the device is held in one hand of an operator for carrying and presenting the device to individual records attached to goods to which they relate, a plurality of electrical switches in said device each connected to a source of power and to an individual one of said storage devices, said switches and said storage devices being connected through a flexible cable so that the sensing device is manipulated independently of said storage unit for presentation to records attached to goods separated from the storage unit, and means associated with said switches for sensing code indications on a record to which the device is presented and for closing or opening said switches according to the code indications sensed, thereby connecting individual storage devices to the source of power for storing representations of the code indications sensed.

7. A data processing apparatus comprising a storage unit having a plurality of electrically operated storage devices and a record sensing device remote from said storage unit and of lightweight construction supportable in one hand of an operator for extended periods of time, said device including a handle by which the device is held in one hand of an operator for carrying and presenting the device to individual records attached to goods to which they relate, a plurality of electrical switches in said device each connected to a source of power and to an individual one of said storage devices, said switches and said storage devices being connected through a flexible cable so that the sensing device is manipulated independently of said storage unit for presentation to records attached to goods separated from the storage unit, means associated with said switches for sensing code indications on a record to which the device is presented and for actuating all of said switches according to the code indications sensed, thereby connecting indidivual storage devices to the source of power for storing representations of the code indications sensed, and means operative upon completion of the sensing of said record for processing the stored representations whereby all code indications on a record are simultaneously sensed and stored and thereafter processed independently of the sensing device thereby allowing the sensing device to be immediately presented to another record while the processing means is utilizing the stored code representations.

8. A data processing apparatus comprising a storage unit having a plurality of electrically operated storage devices and a record sensing device remote from said storage unit and of lightweight construction supportable in one hand of an operator for extended periods of time, said device including a handle by which the device is held in one hand of an operator for carrying and presenting the device to individual records attached to goods to which they relate, a plurality of electrical switches in said device each connected to a source of power and to an individual one of said storage devices, said switches and said storage devices being connected through a flexible cable so that the sensing device is manipulated independently of said storage unit for presentation to records attached to good separated from the storage unit, means associated with said switches for sensing code indications on a record to which the device is presented and for simultaneously actuating all of said switches according to the code indications sensed thereby connecting individual storage devices to the source of power for storing representations of the code indications sensed, means operative upon completion of the sensing of said record for processing the stored representations whereby the sensing of all code indications on a record is accomplished simultaneously allowing the sensing device to be immediately presented to another record while the processing means is utilizing the stored code representations, and means for rendering the switches ineffective to cause actuation of the storage devices until all stored representations from the previous record have been processed.

9. A device for sensing perforated records, said device being of lightweight construction supportable in one hand of an operator for extended periods of time comprising a sensing assembly including a frame, electrical contacts mounted on said frame, pins mounted in said frame for independent axial movement, one end of each pin being engageable with a record to which the device is presented to sense the presence or absence of a perforation in an individual code index position on the record, the other end of each pin engaging one of said contacts to close said contact with a source of electrical power upon axial movement relative to said frame, a casing enclosing said sensing assembly against contamination and on which the frame is mounted for movement axially of said pins, said casing being perforated to allow said pins to project therethrough, a spring biasing the frame for normally retracting the pins within the casing, a support mounted on the exterior of said casing and adapted to receive a record which remains attached to goods to which it relates for registering the code index positions of the records with the sensing pins, a handle on said casing by which the device is held in one hand of an operator for carrying and presenting the device to individual records which remain attached to goods to which they relate, and means coacting with the handle for moving said frame relative to the casing for projecting said pins through the casing to sense a registered record thereby causing the pins to be moved axially relative to the frame in accordance with the code perforations sensed thereby and causing said contacts to be closed with the source of power according to the perforations sensed.

10. A device for sensing perforated records, said device being of lightweight construction supportable in one hand of an operator for extended periods of time comprising a sensing assembly including a frame, electrical contacts mounted on said frame, pins mounted in said frame for independent axial movement, one end of each pin being engageable with a record to which the device is presented to sense the presence or absence of a perforation in an individual code index position on the record, the other end of each pin engaging one of said contacts to close said contact with a source of electrical power upon axial movement relative to said frame, a casing enclosing said sensing assembly against contamination and on which the frame is mounted for movement axially of said pins, said casing being perforated to allow said pins to project therethrough, a spring biasing the frame for normally retracting the pins within the casing, a support mounted on the exterior of said casing and projecting therefrom for receiving a record which remains attached to goods to which it relates, said support being movable from the projecting position to a sensing position for registering the code index position of the record with the sensing pins, a handle on said casing by which the device is held in one hand of an operator for carrying and presenting the device to individual records attached to goods to which they relate, and means coacting with the handle for moving said frame relative to the casing for projecting said pins through the casing to sense a registered record thereby causing the pins to be moved axially relative to the frame in accordance with the code perforations sensed thereby and causing said contacts to be closed with the source of power according to the perforations sensed.

11. A device for sensing perforated records, said device being of lightweight construction supportable in one hand of an operator for extended periods of time comprising an assembly including a frame, a plurality of selecting punches mounted on said frame, electrical contacts mounted on said frame, pins mounted in said frame for independent axial movement, one end of each pin being engageable with a record to which the device is presented to sense the presence or absence of a perforation in an individual code index position on the record, the other end of each pin engaging one of said contacts to close said contact with a source of electrical power upon axial movement relative to said frame, a casing enclosing said assembly against contamination and on which the frame is mounted for movement axially of said pins, said casing being perforated to allow said pins and punches to project therethrough, a spring biasing the frame for normally retracting the pins and the punches within the casing, a support mounted on the exterior of said casing and adapted to receive a record which remains attached to goods to which it relates for registering the code index positions of the record with the sensing pins, a handle on said casing by which the device is held in one hand of an operator for carrying and presenting the device to individual records which remain attached to goods to which they relate, and means coacting with the handle for moving said frame relative to the casing for projecting said pins and said punches through the casing to sense a registered record thus causing the pins to be moved axially relative to the frame in accordance with the code perforations sensed thereby causing said contacts to be closed with the source of power according to the perforations sensed, and also causing said punches to perforate the record to indicate that the record has been sensed.

12. A device for sensing perforated records, said device being of lightweight construction supportable in one hand of an operator for extended periods of time comprising a compact sensing assembly including a frame, a plurality of selective punches mounted on said frame, electrical contacts mounted on said frame, pins mounted in said frame for independent axial movement, one end of each pin being engageable with a record to which the device is presented to sense the presence or absence of a perforation in an individual code index position on a record to which the device is presented, the other end of each pin engaging one of said contacts to close said contact with a source of electrical power upon axial movement relative to said frame, a casing enclosing said sensing assembly against contamination and on which the frame is mounted for movement axially of said pins, said casing being perforated to allow said pins and punches to project therethrough, means for selecting one of said punches to perforate a record to which the device is presented including a knob which projects through the casing to a position accessible to an operator, a spring biasing said frame for normally retracting the pins and the punches within the casing, a support mounted on the exterior of said casing and adapted to receive a record which remains attached to goods to which it relates for registering the index position of the record with the sensing pins, a handle on said casing by which the device is held in one hand of an operator for carrying and presenting the device to individual records which remain attached to goods to which they relate, and means coacting with the handle for moving said frame relative to the casing for projecting said pins and the selected punch through the casing to sense a registered record thus causing the pins to be moved axially relative to the frame in accordance with the code perforations sensed thereby causing said contacts to be closed and opened according to the perforations sensed, and also causing said punch to perforate the record to indicate that the record has been sensed.

References Cited in the file of this patent

UNITED STATES PATENTS

| | | |
|---|---|---|
| Re. 21,133 | Lake | June 27, 1939 |
| 1,839,402 | Lorant | Jan. 5, 1932 |
| 2,018,420 | Robinson et al. | Oct. 22, 1935 |
| 2,394,604 | Ford | Feb. 12, 1946 |
| 2,498,896 | Read | Feb. 28, 1950 |
| 2,595,889 | Ryffel et al. | May 6, 1952 |
| 2,736,379 | Winn et al. | Feb. 28, 1956 |
| 2,774,429 | Rabenda | Dec. 18, 1956 |
| 2,878,872 | Burns et al. | Mar. 24, 1959 |